May 31, 1938.  E. D. DOYLE ET AL  2,119,205
METHOD AND SYSTEM OF MOTOR CONTROL
Filed April 18, 1936   2 Sheets-Sheet 1
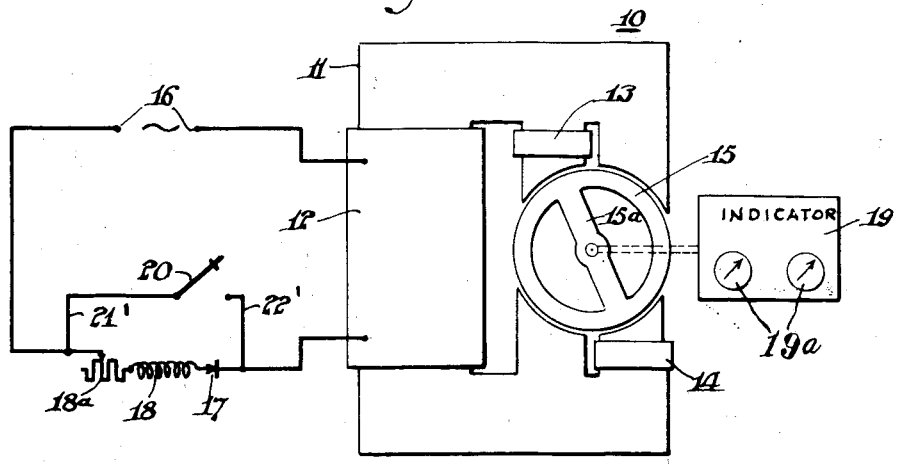
Fig.1.
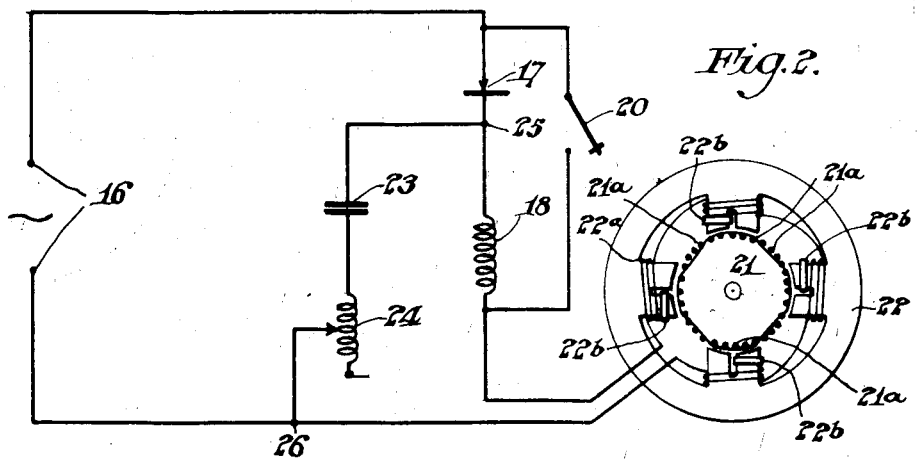
Fig.2.
Fig.3.
Inventors
Edgar D. Doyle and
Benjamin J. Wilson
By Cornelius D. Ehret
Attorney.

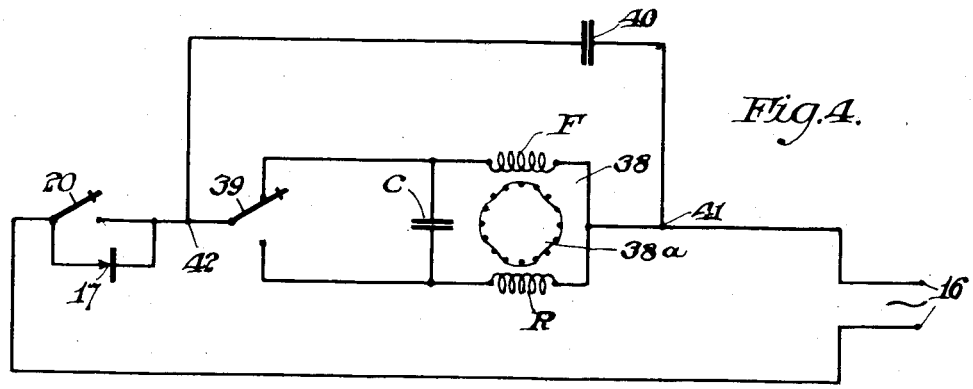
Fig. 4.
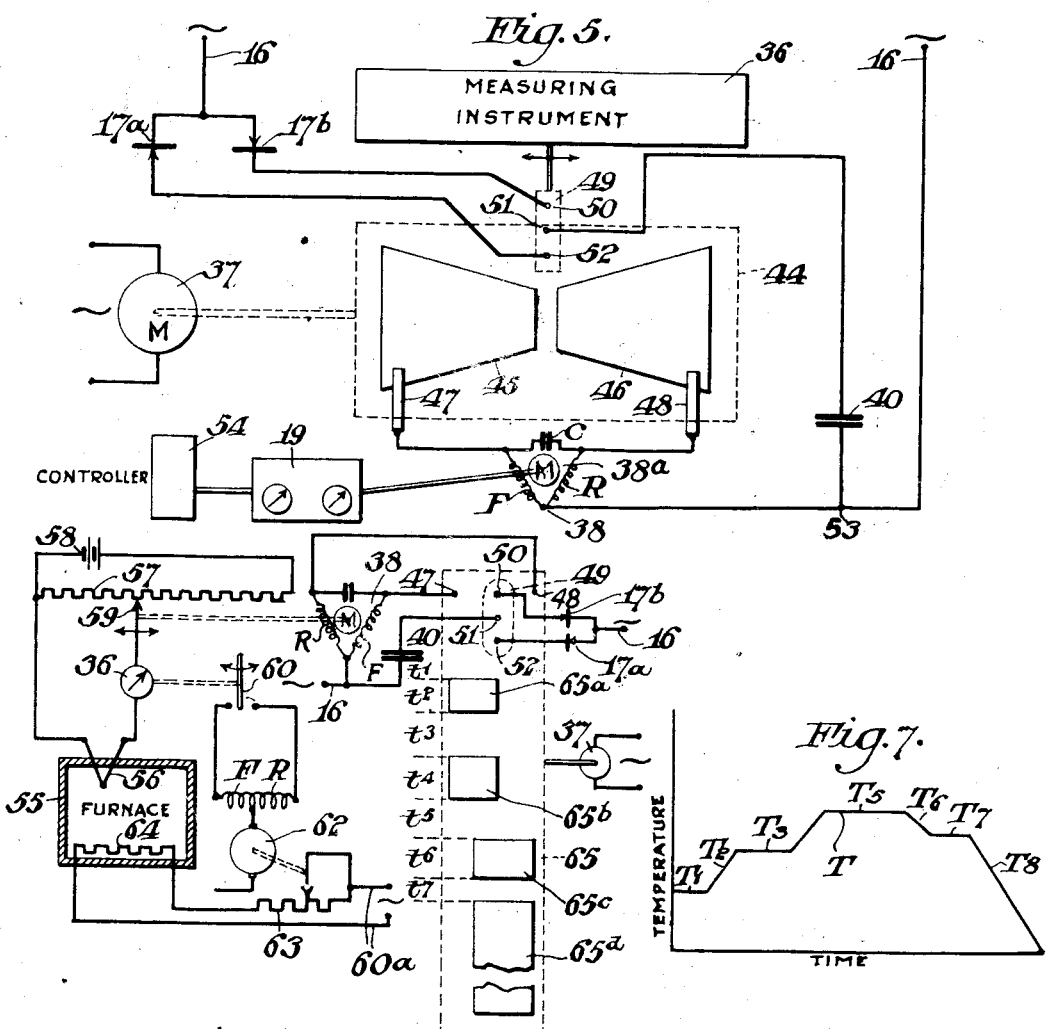
Fig. 5.
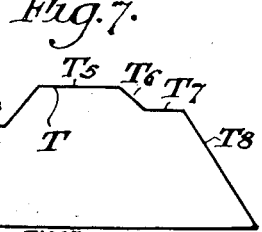
Fig. 7.
Fig. 6.
INVENTORS
Edgar D. Doyle and
Benjamin J. Wilson
By Cornelius D. Ehret
Attorney.

Patented May 31, 1938

2,119,205

UNITED STATES PATENT OFFICE 2,119,205

METHOD AND SYSTEM OF MOTOR CONTROL

Edgar D. Doyle and Benjamin J. Wilson, Philadelphia, Pa., assignors to Leeds & Northrup Company, Philadelphia, Pa., a corporation of Pennsylvania Application April 18, 1936, Serial No. 75,048

12 Claims. (Cl. 172—274)

Our invention relates to methods and systems of motor control, more particularly to an organization by means of which the number of revolutions of a motor between starting and stopping constitutes an accurate measure of the time interval between closure and rupture of the motor-running circuit, and has for an object elimination of starting and stopping errors so that for a succession of periods of motor energization the number of revolutions shall, for each period, be an extremely accurate measure of the duration thereof.

Our invention is applicable to a wide variety of applications such, for example, to timing systems, program controllers, integrating systems, and measuring and/or controlling systems.

Heretofore the use of electric motors for determining or predetermining time intervals, particularly of short duration, have not been entirely satisfactory because of variable coasting periods incident to deenergization of the motor. Additional errors were introduced during starting and stopping periods due to variable friction caused by change in characteristics of the motor lubricant, particularly in its viscosity as affected by temperature.

It is therefore a further object of our invention to eliminate the variable friction caused by change in the viscosity of the motor lubricant by maintaining the temperature of the motor and its lubricant constant irrespective of whether the motor is running or is at standstill.

In carrying out our invention in one form thereof a motor of a character which runs, when energized with current alternating in character, and which is braked or brought to standstill when energized with current unidirectional in character, is connected in series with a translating device, such as a rectifier or electric valve. to a source of alternating current. Suitable means is provided, as a by-pass circuit and circuit controller, for shunting the rectifier or translating device in order to energize the motor with alternating current for running operations. By interrupting the by-pass circuit, the translating device or rectifier is rendered effective and coincidentally with the interruption of that circuit changes the motor current from its alternating to its unidirectional character.

In accordance with a further aspect of our invention, a suitable impedance or reactance device is associated with the translating device, rectifier, or one-way valve for reducing the alternating component of the rectified current or for suppressing the pulsating character of the unidirectional current; stated differently, the reactance device, whether it be a capacitor or an inductance, maintains the magnitude of the unidirectional current substantially constant.

Further in accordance with our invention, the revolutions of the motor can be utilized accurately to measure the length of the time interval between closure and rupture of the motor-running circuit. During starting, or during acceleration to synchronous speed, the time required for each revolution of the rotor is greater than at synchronous speed. Therefore, the braking effort, after rupture of the motor-running circuit, is controlled so that the number of revolutions of the rotor, or fraction thereof, before the rotor is brought to rest, is substantially identical with the difference between the number of revolutions completed at synchronous speed for a time interval equal to the starting period, and the number and/or fraction of revolutions actually completed prior to attainment of synchronous speed. By thus controlling the braking effort or magnitude of the unidirectional current, the total number of revolutions completed between starting and stopping of the motor is equal to the number of revolutions which would be completed for synchronous operation during a time equal to duration of the supply of alternating current. In consequence, a simple, inexpensive revolution counter may be calibrated directly to indicate and/or record time intervals.

Further in accordance with our invention, the motor is preferably continuously energized at standstill by current unidirectional in character, in order to maintain the temperature of the motor constant; by so doing the motor lubricant is maintained at a constant or uniform temperature and its viscosity, because not changing, does not introduce variation in friction which would have the effect of changing the time required for starting and, particularly, the time required, after deenergization, for the motor to come to a standstill.

For a more complete understanding of our invention reference may be had to the accompanying drawings, in which:

Figure 1 diagrammatically illustrates a motor and control system embodying our invention;

Fig. 2 illustrates diagrammatically a modification of our invention as applied to a different type of motor;

Fig. 3 illustrates diagrammatically our invention as applied to an integrating system;

Fig. 4 illustrates our invention as applied to a reversible motor;

Fig. 5 illustrates our invention as applied to a reversible motor in conjunction with a differential integrating system;

Fig. 6 illustrates our invention as applied to a program controller for a furnace, and Fig. 7 is a curve plotted with time as abscissae and furnace temperatures as ordinates, explanatory of the operation of the program controller of Fig. 6.

Referring to the drawings, we have shown our invention in one form as applied to the control of a self-starting single phase synchronous motor 10 of the type available on the market under the trade name "Telechron", or such as described in United States Letters Patent to Warren, No. 1,546,269. The motor stator frame 11 is provided with field winding 12 and shading coils 13 and 14 which produce a rotating magnetic field for the rotor. The latter comprises one or a series of annular members or washers 15; these members 15, formed of magnetic steel or iron, each comprises a continuous flat ring provided with a magnetic bar or polarizable element 15a across a diameter thereof. When more than one of the members 15 are used, the bars are fixedly secured to the rotor shaft in alinement with each other. The closed or circumferentially continuous ring of each member 15 forms a starting element and each bar 15a constitutes a synchronizing element. When the field winding 12 is energized with alternating current, as from any commercial source of supply, the shading coils 13 and 14 change, in the space between the opposing coils, the alternating magnetic field into a rotating field. The magnetic remanence in the periphery of each member 15 causes the development of torque, i. e. the members 15 are pulled around with the rotating field. Motors of this type have very rapid starting characteristics and quickly attain synchronous speed which is then maintained. By reason of the low reluctance path through each of the magnetic bars 15a, the rotating magnetic field concentrates therethrough and magnetically locks the bars or polarizable elements 15a in synchronism therewith, and therefore in synchronism with the stator current.

We have found that motors of the aforesaid type when supplied with current of a unidirectional character are braked to a standstill. The unidirectional and stationary or non-rotating magnetic field produced by the unidirectional energization of winding 12 cooperates with elements 15 to oppose rotation thereof; the rotor is quickly and almost instantaneously brought to a standstill by reaction between the stationary or non-rotating magnetic flux and that induced, or remaining, in each element 15; thus the bars 15a, when bridging the air gap between opposite field poles of the stator, form low reluctance paths, the resulting flux therethrough strongly retaining each bar 15a in a fixed position.

The motor 10 may be energized from a source of direct current with a translating device connected in circuit therewith to transform the direct to the alternating current, or, as shown, a translating device, a one-way electric valve, or a copper-oxide rectifier 17, may be utilized to transform or convert the alternating current from source of supply 16 to current unidirectional in character. Rectifiers of the copper-oxide type are not, strictly speaking, completely unidirectional in their action; they need not be perfect rectifiers in the sense some inverse current is permissible but they do offer greatly increased opposition to current waves of one sign, or to current flowing in one direction, while their opposition to current waves of the opposite sign, or to current flowing in the opposite direction, is relatively greatly reduced. With a single cell 17 comprising one or more rectifier units and generally referred to as a half-wave rectifier, the current is preponderantly or substantially entirely unidirectional but of a pulsating character, or including a component of inverse or alternating current. If the component of alternating current is too great, the motor 10 may operate at half its normal synchronous speed. Effectively to prevent half-speed or sub-synchronous motoring and insure braking, a predetermined amount of inductance, of the order of 16 henrys, for a 110 volt line, may be provided by an impedance device 18 included in the motor circuit for the suppression of the alternating component or the pulsating character of the unidirectional current.

While only the single rectifier 17 is shown, it shall be understood additional rectifiers may be connected in series, or in series parallel, depending upon the voltage of the source of supply, and the magnitude of the motor-running current. Similarly the magnitude of the reactance or inductance 18 is proportioned with reference to the supply voltage and the degree to which it is necessary to reduce the alternating component of the unidirectional braking current. With sufficient inductance including 18 and that of the motor field winding 12, only one or two copper-oxide rectifying units need be connected in series, for a 110 volt A. C. line.

A switch or circuit controller 20 in conjunction with conductors 21' and 22' is arranged to complete a by-pass circuit around the rectifier 17 and the impedance 18. With the switch 20 in its open circuit position it will be understood the motor 10 receives from the source 16 current comprising half-waves of one sign, the inductance 18 serving to smooth out the ripple of the forward current, and to reduce inverse current. The resulting current does not produce a motor-running torque; on the contrary, the rotor 15 is by a substantial braking effort quickly braked or brought to standstill and magnetically retained at rest in a fixed position where the elements 15a produce minimum reluctance paths between the poles of the stator.

Assuming now that the switch 20 is moved to its closed position to shunt or by-pass the rectifier 17 and the impedance 18, the motor is energized with alternating current; it is quickly accelerated to synchronous speed and thereafter, as is well understood, operates in synchronism with the rotating field and supply current. In order to stop the motor it is merely necessary to open switch 20. Thereupon the current is instantaneously and/or coincidentally changed in character from alternating to unidirectional, to produce a braking effort quickly to bring the rotor 15 to standstill without the development of a motor torque which would tend to rotate the armature in the reverse direction, a characteristic essential when our system is used as a timer or for timing operations.

In recording the length of time intervals any suitable type of recording mechanism may be utilized such, for example, as the indicator 19 diagrammatically illustrated as connected to the rotor 15. At the beginning of the time interval to be measured the switch 20 is closed to initiate operation of the motor and at the end of the time interval the switch is opened. Though a braking effort is applied to the rotor coincidentally with rupture of the motor-running circuit, the rotor continues to move until the energy stored in the moving parts has been dissipated to a value below that of the braking effort. The additional movement of the rotor does not introduce an error in the measurement of the time interval between opening and closing of the switch 20; on the contrary, that additional movement is utilized to compensate for the starting or accelerating period during which the rotor speed is less than during synchronous operation. Accordingly the braking effort, through control of the braking current, as by adjustable resistance 18a, is predetermined so that the aforesaid additional movement of rotor 15 after opening of the switch 20 is equal to the difference between the number of revolutions completed at synchronous speed during a time-interval equal to the starting period, and the number and/or fraction of revolutions actually completed prior to attainment of synchronous speed.

Since the aforesaid starting error is corrected by the stopping period, it is clear the indicator 19 may be calibrated so that lengths of time may be read directly from its indicating dials and pointers 19a; or the time interval may be determined by calculation from the number of revolutions, or from tables.

The commercial form of motors of the type shown in Fig. 1 generally include an oil-filled non-magnetic housing within which the rotor 15 is journaled. Since the temperature of the lubricating oil, or lubricant, has a substantial effect on its viscosity and so gives rise to variation in friction, it is desirable, if not necessary, in motors of this type, to eliminate that variation, thereby to prevent errors in the indications of the indicator 19 or in otherwise measuring the time intervals. To this end the ratio between the resistance and the inductance of the impedance device 18, or, more broadly speaking, the relation between the resistance and the inductance of the motor circuit, is predetermined so that the motor-heating effects of the alternating and unidirectional currents are substantially the same. The result is a substantially constant motor temperature, thereby substantially if not entirely eliminating the effects of variable temperature upon the viscosity of the lubricating oil. When the motor is first used as a timer, or otherwise, it is desirable to connect it to its source of supply for a sufficient time-interval to insure the attainment of the predetermined motor temperature. If this is done, measurement of the first time-interval will be of the same high degree of accuracy as later measurements.

The foregoing adjustment for equalized heating effects is in addition to the adjustment for elimination of starting and/or stopping errors. Should the rotation of the rotor, after opening of the switch 20, be less than, or exceed the amount necessary to compensate for the starting error, corresponding corrections may be made to the time-interval indication or record of the indicator 19 in lieu of adjustment of the braking effort, or of the unidirectional current.

In one embodiment of our invention we have operated over a twenty-four hour period, a motor in the manner described above by successively closing the switch 20 to energize the motor with alternating current, after a one-minute interval opening the switch to supply to the motor unidirectional braking current, and after a second one-minute interval again reclosing the switch. The one-minute periods during which the switch 20 was closed, were, as determined by readings of the indicator, found to be indicated with exceedingly great accuracy; the average error per operation for each time interval measured was less than five-thousandths of a second.

Aside from the errors introduced due to change of viscosity, we have found that with coasting periods, and without the coincidental change between braking and running operations, the average error for corresponding one-minute periods of time measured, exceeded one-tenth of a second.

Our invention is applicable also to a "squirrel cage" rotor induction motor where the rotor is provided with a plurality of projections to form one or more polarizable elements. Single phase motors of this type, as is well understood in the art, may be made self-starting and have the characteristic of rotating at synchronous speed. The usual commercial form of the motor does not include the large quantity of lubricating oil and the effects of changes in the viscosity of the oil are correspondingly less, if not negligible. As illustrated in Fig. 2, the rotor 21, provided with polarizable elements or projections 21a, rotates within a stator 22, provided with shading coils 22b and stator winding 22a the latter being energized from a source of alternating current supply 16. In series with the stator winding 22a and the source of supply is a translating device or rectifier 17 and an impedance device 18, both shunted by the switch 20. The impedance device, as before, serves to suppress the pulsating character of the unidirectional current and may have an inductance of the order of 16 henrys, when used with a mercury vapor rectifier and a stator winding having 8 watts input at 110 volts 60 cycles. In order separately and further to reduce the pulsating character of the unidirectional current provided by the rectifier 17, an impedance device or capacitor 23, connected in series with an inductance 24, is connected at 25 between the rectifier 17 and the impedance 18 and at 26 to the opposite side of the stator winding 22a. The capacitor may be of a size of the order of 4 microfarads and the variable inductance 24 of a size such that the circuit may be tuned to the frequency of the source, ordinarily 60 cycles. Thus, when the switch 20 is in its open circuit position any small magnitude of alternating current which flows through the device 17 will follow the path of least impedance, that provided by the tuned circuit comprising capacitor 23 and inductance 24. The aforesaid tuned circuit is not essential, particularly if a perfect rectifier, one which is strictly a one-way conductor as contrasted with rectifiers of the copper-oxide type, is used. In any event, we have found the use of the tuned circuit and the impedance 18 desirable because a motor of this type also develops a motor torque, if the amplitude of the unidirectional pulsations is too great. In fact, greater suppression of the alternating, or reverse current, is desirable with motors of this type to prevent motor operation at half synchronous speed; this because the reluctance of the rotor is ordinarily much less than in the case of the motor shown in Fig. 1. The aforesaid device 18 and the tuned circuit, however, insure the braking operation characteristic of our invention.

Applying our invention to an integrator, Fig. 3, a motor 30 of any of the types hereby contemplated, or shown in Fig. 1 or 2, may be used to operate an indicating and/or recording device 31. The motor 30 is energized under the control of a proportional contactor 32 which comprises a triangular or V-shaped conductive segment 32a mounted on a drum 32b driven by a motor 37 preferably at constant speed, as a synchronous motor energized from a suitable source of supply 16a, preferably from the same source 16. It will be observed the motor 30 is normally connected in series with a one-way valve or rectifier 17, an impedance device 18, and to the source of supply 16. A pair, 34, 35, of contact fingers is arranged to engage the conductive segment 32a to complete a by-pass circuit around the rectifier 17 and impedance 18 to energize the motor. The contact member 35 is mounted for transverse movement by a mechanical relay or sensitive measuring instrument 36, preferably of the type described in U. S. Patent No. 1,935,732 to Squibb, dated November 21, 1933; a mechanical relay or instrument of that type is well suited for the movement of the contact 35 relative to the triangular shaped segment 32a. By connecting the measuring instrument 36 to be responsive to a variable mechanical electrical or chemical condition, the contact member 35 may be moved to a position with respect to the triangular segment 32a corresponding to the magnitude of the condition. In consequence, the period during which the motor 30 is energized with current alternating in character will be dependent upon the duration of contact of the member 35 with the segment 32a. As the contact finger or member 35 is moved to the left from the position shown in Fig. 3, the length of contact and the period of alternating current energization is increased. When member 35 is moved to the right the aforesaid period is decreased. Each time the by-pass circuit around the rectifier 17 and impedance device is interrupted, by the segment 32a leaving contact finger 35, the current alternating in character is instantaneously changed to one unidirectional in character which, as described above, produces braking of the motor 30. The number of revolutions of the motor 30 recorded by the device 31 is in consequence proportional to or a direct measure of the time interval during which the contact finger 35 is in engagement with the segment 32a. If desired, the device 31 may be calibrated to integrate with respect to time the magnitude of the condition under measurement since the time intervals of the motor-running periods are controlled in response to the instantaneous or momentary values of the magnitude of the condition.

Our invention is further applicable to reversible motors of the capacitor type. As shown in Fig. 4, the stator of a capacitor or condenser motor 38 is provided with field windings F and R, connected in closed circuit relation with a starting or phase shifting capacitor C. A one-way valve or rectifier 17 is connected in series with the motor circuit and the source of supply 16. As before, a switch 20 serves to complete a by-pass or shunt circuit around the one-way valve 17. Interposed between the field windings F and R and the one-way valve 17 is a direction selecting switch 39 operable from one position to another selectively to control the energization of windings F and R to predetermine the direction of rotation of the rotor 38a preferably identical in shape with rotor 21 of Fig. 2. The direction selecting switch 39 is preferably of the type which retains its contacts in the position to which they are last operated, although it shall be understood that the direction selecting switch may be incorporated as a part of or in cooperative relation with the switch 20, the requirement in such instance being delayed opening of the switch 39 after opening of the switch 20. In order to increase the unidirectional character of the motor current during braking, or to decrease the alternating component of the braking current, an impedance device or capacitor 40 is connected in shunt circuit relation with the motor at points designated at 41 and 42. The capacitor 40 has been found to be entirely effective to prevent development of a running-torque and insure braking.

To produce forward rotation, the direction switch 39 is moved to one of its positions, as shown the upper position, to connect the field winding F for energization by alternating current incident to the closure of the switch 20. The motor 38 then rotates in the forward direction. To produce braking it is only necessary to open the switch 20, the one-way valve 17 supplying current waves of one sign to the motor, the unidirectional charteter of which is increased by the capacitive reactance of capacitor 40, which for the capacitor motor is more effective than series inductance in association with the rectifier. As above described, the unidirectional character of the current brakes the motor to standstill, there being no tendency for the motor to rotate in the reverse direction.

For reverse operation, the direction selector switch 39 is moved to its other, or lower, position, and the switch 20 thereafter closed to energize the motor for reverse rotation. As before, by opening the switch 20, unidirectional current is supplied to the motor and it is braked to a standstill.

While the sequence of operation of switches 20 and 39 is preferably the order aforesaid, under some circumstances the switch 20 may first be closed and the selector switch 39 thereafter moved to a position to produce forward or reverse rotation. In either case to obtain accurate indication of the period of running time, it is necessary to open the switch 20 prior to the interruption of the circuit by the selector switch 39. Otherwise the motor would not be braked to standstill and the errors introduced by coasting of the motor would be present.

In Fig. 5, by way of example, we have illustrated an application of the reversible motor 38 to a proportional control apparatus which may be of the character generically described in U. S. patent to Doyle, No. 1,930,353, dated October 10, 1933. In this case a constant speed or synchronous motor 37 drives a drum 44 on which is mounted two tapering or V-shaped contact segments 45 and 46. The winding F is connected to a contact finger 47 engaging the widest portion of the segment 45, while the winding R is connected by contact finger 48 to the widest portion of the segment 46. By means of a measuring instrument or sensitive mechanical relay apparatus 36, a movable contact block 49 is displaced across or moved axially of the drum 44. Supported on the block 49 are contact elements or fingers 50, 51 and 52, each disposed for resilient engagement with the drum and one or the other of the segments 45 and 46. One conductor of the source of supply 16 is connected through a pair 17a, 17b, of one-way valves or rectifiers, one valve 17b being connected to the contact element 50 and the other valve 17a being connected, in reverse sense, to the contact element 52. The capacitor 40, connected to the contact element 51, and at 53 to the motor, serves the above described purpose of increasing the unidirectional character, or of decreasing the alternating component, of the braking current.

It will now be assumed the measuring instrument is suitably connected to be responsive to a condition which is normally maintained at a predetermined value and/or magnitude, the object of the present application of the invention being to integrate, measure, the extent of time deviation from said given magnitude. When the magnitude of the condition is normal the block 49 occupies a position midway of or between the narrow ends of segments 45 and 46 so that upon rotation of the drum 44 no circuits are completed and the rotor 38a remains at rest. Upon deviation of the condition in one direction, the block 49 is by the measuring instrument 36 moved towards the left toward segment 45. As that segment engages contact element 52, unidirectional current flows from one side of the source 16 through the motor field winding F, contact member 47, segment 45, contact element 52, rectifier 17a and to the other side of the source 16. Upon further movement of drum 44 the capacitor 40 is connected in shunt circuit relation with the stator windings F and R. Thereafter, contact element 50 connects the valve 17b in parallel with the valve 17a to complete a circuit for flow of alternating current between the respective terminals of the source of supply; the current waves of one sign pass through the rectifier 17a and the current waves of the opposite sign pass through the rectifier 17b. The motor 38 is thereby energized for forward rotation. As soon, however, as the segment 45 interrupts the circuit completed through contact element 52, the current waves of one sign are interrupted while the current waves of the opposite sign continue to flow through the contact segment 50 and the valve 17b. The result is that the rotor 38a is quickly braked to standstill, the capacitor 40 continuing to function to increase the unidirectional character of the current until it is disconnected by movement of the segment 45 out of engagement with the contact element 51. The speed of the motor 37, the width of the contact segment 45 at its narrowest portion, and the spacing of contact elements 50, 51 and 52, are predetermined with respect to each other so that the braking period is sufficiently long to bring the rotor to a standstill and entirely eliminate all free-running or coasting periods.

By means of the simple indicator 19 driven by the motor 38, the extent of rotation of the motor is readily determined.

Assuming now that there has been a departure in the magnitude of the condition in the opposite direction from its normal value, and that the block 49 has been moved into a position to be engaged by the segment 46, it will be observed that the aforesaid circuits are completed in the sequence described above. In this case, however, the motor winding R is energized by way of contact member 48 and the motor 38 rotates in reverse direction for a length of time determined by the position of the block 49 with respect to the segment 46, i. e. the period during which contact elements 50 and 52 remain in engagement with the segment 46.

In addition to, or in place of, the indicator 19, a controller or control device 54 may be driven by the motor 38 to operate a valve, control circuit, or other device for controlling the magnitude of the condition under measurement by measuring instrument 36.

Further application of our invention is illustrated in Fig. 6 for program control of temperatures of a furnace 55. In many industrial processes it is desirable to heat materials or products for a predetermined time, gradually elevating the temperature to a predetermined value and maintaining it at that temperature for a predetermined time, and then further elevating the temperature. The temperature of the furnace may later be lowered through the same or different periods of time. To this end a temperature responsive element 56, as a thermocouple or the like, is connected to a potentiometer measuring circuit including resistance or slidewire 57, battery 58, movable slidewire contact 59, and a galvanometer controlled mechanical relay apparatus or instrument 36. The apparatus 36 operates a control switch 60 which, through a reversible motor 62, varies the amount of resistance 63 connected in the heating circuit and including the furnace-heating element 64.

It will, of course, be understood the furnace temperature may be controlled by regulating steam valves or burner-controlling valves, our invention being broadly applicable to any system wherein it is desired to establish a predetermined program of operations.

The program of sequence and duration of operations is determined by means of a control drum 65 on which are mounted a plurality of circumferentially spaced segments 65a—65d. Cooperating with the segments is a contact block 49 supporting contact elements 50, 51 and 52. The drum 65 is driven by a constant speed or synchronous motor 37. Since the furnace heating resistor 64 is normally connected in series with its control resistance 63 across the source of supply 60a, it will be observed that the furnace is normally at a relatively low temperature. As shown in Fig. 7, it is desired to maintain the temperature of the furnace at this value for the time T1. Accordingly, the distance t1 between the contact 50 and the first contact segment 65a is determined with respect to the speed of the motor so that said time T1 is required for the drum 65 to move the contact 65a into engagement with contact elements 50 and 52. As soon as effective, these elements 50 and 52 complete an energizing circuit for the field winding F of motor 38 which then operates in the correct, as the forward, direction to move the slidewire contact 59 a predetermined distance along resistance 57 to unbalance by a predetermined amount the potentiometer circuit. The circuit is, by the thermocouple 56, rebalanced as soon as the furnace temperature is elevated an amount corresponding to the new setting of the slidewire 57.

Therefore by means of any suitable device responsive to current unbalance of the potentiometer circuit, as for example a galvanometer controlled mechanical relay 36 of the type described and shown in Doyle Patent No. 1,918,021, issued July 11, 1933, the heating current of the furnace heating element or resistor 64 may be increased. As shown, the relay 36, in response to the aforesaid current unbalance, operates the direction selecting switch 60, to energize the motor 62 in a direction to decrease the value of the resistance 63 connected in the heating circuit. The resulting increased heating current causes the temperature of the furnace 55 to rise, for example as indicated by section T2 of curve T of Fig. 7.

As soon as the furnace temperature reaches its new value T3, the potentiometer circuit is by thermocouple 56 rebalanced; the relay 36 returns the direction switch 60 to its neutral position, deenergizing the motor 62.

An increase in furnace temperature above the value T3 unbalances the potentiometer circuit in the opposite direction; in response thereto, the relay 36 operates the direction switch to cause the motor 62 to decrease the heating current until the furnace temperature is returned to the value T3.

Since the setting of the slidewire 57 predetermines the temperature of the furnace, it is necessary to insure that the slidewire shall be moved only an amount corresponding to the desired change of furnace temperature. This is accomplished by predetermining the time the motor 38 is energized, as by predetermining the width of segment 65a so that the motor 38 is energized for the exact time-interval desired. As already explained, the extent of rotation of the motor 38 may be used as an accurate measure of time-intervals. Conversely, by predetermining the time-interval of energization the extent of rotation of the motor 38 is predetermined with great precision; more specifically the slidewire contact 59 is moved a distance directly proportional to the synchronous speed of motor 38 multiplied by the time of alternating current energization thereof. The result is that the slidewire 57 is adjusted to correspond to the furnace temperature T3.

The period of heating at the new temperature is determined by the distance t3 between the segment 65a and the next segment 65b, and corresponds to that section T3 of the curve T of Fig. 7.

As soon as the segment 65b is moved into engagement with contact elements 50 and 52 carried by contact block 49, the slidewire 57 is again adjusted for the next temperature T5; the furnace temperature is then elevated to that value which, in the example illustrated, is the maximum temperature developed by the furnace.

In order to reduce the temperature by predetermined time-interval steps, a second series of segments 65c, 65d, is disposed on drum 65 for cooperation with the contact elements carried by block 49 and the contact finger 48. Registration of contacts 50 and 52 with segment 65c energizes the winding R of the motor 38 to produce reverse rotation to reduce the temperature setting of the slidewire 59. The galvanometer-controlled mechanical relay 36, direction switch 60, and motor 62 thereupon function to decrease the heating current through resistor 64 causing the furnace temperature to decrease to a value T7 of curve T. If desired, the last segment 65d may be of relatively great width to return slidewire contact 59 to a minimum temperature position, causing the temperature of the furnace rapidly to diminish as indicated by the section T8 of the curve of Fig. 7.

It will be understood that instead of controlling temperature, our invention is applicable to other types of program controllers, such, for example, as the control of acidity or other chemical characteristics of a solution, and for the control of signs, lighting exhibits, or industrial processes.

While we have shown particular embodiments of our invention, it will be understood, of course, that we do not wish to be limited thereto since many modifications may be made, and we therefore contemplate by the appended claims to cover any such modifications as fall within the true spirit and scope of our invention.

What we claim is:

1. In combination, a single phase, self-starting, synchronous motor of a type whose rotor is accelerated to synchronous speed or is braked to standstill depending upon whether its energizing current is alternating or unidirectional in character, a source of alternating current, an electric valve connected in circuit with said motor for supplying to said motor from said source, current of said unidirectional character, control means operable to one position to complete a by-pass circuit for said valve and to another position to open said by-pass circuit, and means included in circuit with said electric valve for controlling the magnitude of the braking effort so that said rotor before coming to standstill rotates an amount sufficient to compensate for operation of said rotor during acceleration from standstill to synchronous speed at a speed below its synchronous speed.

2. The method of determining by the number of revolutions of the rotor of a self-starting synchronous motor, the time-interval between the closure and rupture of the motor-running circuit which comprises supplying the motor with current alternating in character to produce a rotating field to start the motor and after a predetermined starting period to establish operation in synchronism with said field, changing the motor current to one unidirectional in character, and controlling the magnitude of said unidirectional current to bring the rotor to standstill after extent of rotation thereof equal to the difference between the number of revolutions, completed at synchronous speed during a time-interval equal to the starting period, and the number of revolutions actually completed during said starting period.

3. A timing system comprising a motor of a type whose rotor runs at synchronous speed or is braked to standstill depending upon the alternating or unidirectional character of the motor current, a source of alternating current, means for indicating the extent of rotation of said rotor from a predetermined angular position, means for eliminating coasting of said motor comprising a unidirectional valve connected in circuit with said source and said motor for supplying said motor with current of said unidirectional character, means for opening and closing a by-pass circuit around said valve whereby current of said unidirectional character begins to flow coincidentally with interruption of current of said alternating character, and means including a rotor-synchronizing element for stopping and thereafter retaining said rotor and said indicating means in said predetermined angular position after completion by said motor of that total number of revolutions which it would have made if during the time of supply of said alternating current and including the starting period, said motor were running at synchronous speed.

4. A system having a source of alternating current comprising a motor of the type which runs when energized with alternating current and which is braked to standstill when energized with unidirectional current, said motor having a rotor provided with polarizable means forming flux paths of reluctance less than other flux paths thereof, means for intermittently supplying said motor with alternating current to produce intermittent synchronous running of said rotor, a unidirectional valve connected in circuit with said source and said motor for supplying said motor with unidirectional current, circuit control means associated with said intermittently operated means for changing coincidentally the character of said motor current to effect braking or running of said motor, and means continuously operable with and by said rotor for indicating by the number of revolutions of said rotor the integrated time during which alternating current is supplied to said motor, and means for controlling the braking and starting operations of said motor so that the total number of revolutions completed between starting and stopping of said motor is equal to the number of revolutions which would be completed for synchronous operation during a time equal to duration of said supply of alternating current.

5. A system comprising a motor, including a rotating element, of the type which runs or is braked to a standstill depending upon the alternating or unidirectional character of its energization, said motor having windings for generating a rotating magnetic field and polarizable means forming a flux path of low magnetic reluctance between selected portions of said element for magnetically locking said rotating element of said motor in step with said rotating field, a single source of alternating current for supplying said motor with alternating motor-running current, rectifier means connected between said source of supply and said motor for supplying thereto braking current unidirectional in character, means for causing said rectifier means instantaneously and without time delay to change said motor current from one alternating to one unidirectional in character, and current controlling means including an impedance device for suppressing the pulsating character of said unidirectional current to produce a stationary magnetic field to brake said element to standstill and magnetically to lock it in a fixed position after completion of that total number of revolutions which the motor would have made if during the time of alternating current energization it were running at synchronous speed.

6. A timing system comprising a motor having a field winding, and a rotor of a character which runs when energized with current alternating in character and which is braked to standstill when energized with current unidirectional in character, said rotor having diametrically thereof a path for magnetic flux of reluctance substantially less than the reluctance of other paths thereof for producing, after starting thereof, operation at synchronous speed, a source of alternating current, electric valve means connected between said motor and said source of supplying said motor with said unidirectional current, means for opening and closing a by-pass circuit around said valve means, said by-pass circuit when closed producing energization of said motor with said alternating current, and means included in circuit with said electric valve means for controlling the magnitude of the motor current unidirectional in character to bring the rotor to standstill after opening of said by-pass circuit and upon completion of a number of revolutions equal to the difference between the number of revolutions completed at synchronous speed during a time-interval equal to the starting period, and the number of revolutions actually completed during the starting period.

7. In combination, a source of alternating current, a self-starting alternating current synchronous motor, means for controlling energization of said motor from said source, a structure driven by said motor a distance directly proportional to the synchronous speed of the motor multiplied by the time of alternating current energization of said motor, and means eliminating error introduced by operation of the motor during the starting period at speeds less than the synchronous speed of said motor comprising means operable under the control of said control means instantaneously to change the current means supplied to said motor to unidirectional current from said same source and of magnitude to brake said motor to standstill upon completion of that total number of revolutions which the motor would have made if throughout said time of alternating current energization and including said starting period it were running at synchronous speed.

8. The method of continuously driving a structure by a self-starting alternating current motor which comprises energizing the motor at the beginning of a time interval from an alternating current source to effect acceleration of the motor to and running at constant speed, at the end of said time interval instantaneously effecting change in the energization of the motor from alternating to unidirectional current derived from said source to decelerate the motor by braking it to standstill simultaneous with completion of that total number of motor revolutions which the motor would have made if throughout said time interval it were running at said constant speed.

9. The method of measuring time intervals in accord with the total number of revolutions of a motor with an error materially less than one-tenth of a second, which comprises energizing from an alternating current source a self-starting motor and thereby effecting acceleration thereof to and running at constant speed, and at the end of the time interval to be measured instantaneously effecting change in the energization of the motor from alternating to unidirectional current from said source and of magnitude to decelerate the motor by braking it to standstill after that number of revolutions thereof equal to the difference between the number of revolutions of the motor in its said period of acceleration to constant speed and the number of revolutions at said constant speed during a period equal to the said period of acceleration.

10. In combination, a self-starting synchronous motor, a source of alternating current, a structure driven by said motor, means for producing between starting and stopping of the motor a movement of said structure the extent of which is dependent, to within less than a tenth of a second upon the time interval during which the motor is supplied with alternating current, comprising means connecting said motor to said source at the beginning of said time interval to produce, after a sub-synchronous starting period, operation of said motor at synchronous speed, means for instantaneously changing to unidirectional current at the end of said time interval the current supplied to said motor from said source, and means for controlling the magnitude of said unidirectional current thereafter to brake said motor to standstill upon completion of that total number of revolutions which the motor would have made if throughout said time interval it were running at said synchronous speed.

11. In combination a motor of a type whose rotor runs or is braked to standstill depending upon whether the motor-energizing current is alternating or unidirectional in character, said rotor comprising one or more continuous rings, each provided with at least one radial arm to form an elongated low reluctance path across said rotor, a source of alternating current, an electric valve connected between said motor and said source for transforming to a unidirectional character the current supplied to said motor from said source, means for opening and closing a by-pass circuit around said valve, said by-pass circuit when closed supplying said motor with alternating current to produce after a sub-synchronous starting period, operation of said rotor at synchronous speed, and when said by-pass circuit is open supplying through said valve unidirectional current from said source to said motor, and means including an impedance device for suppressing the alternating component of said unidirectional current to brake said rotor to standstill, by reaction of the magnetic flux produced by said unidirectional current with said at least one arm, after completion of that total number of revolutions which the motor would have made if during the time interval between closure and rupture of said by-pass circuit the motor were running at synchronous speed.

12. A system for measuring in terms of the total number of revolutions of a motor the time interval between initiation and interruption of motor current alternating in character comprising a motor of a character which runs when energized with current alternating in character and which is braked to a standstill when energized with current unidirectional in character, a synchronizing element of low magnetic reluctance, a single source of current, means including a translating device connected between said source and said motor for transforming current from said source from said one to the other of said characters, and circuit connections including a switch operable, at the beginning of the time interval to be measured, from one position to another for controlling the supply of alternating current to said motor, and operable at the expiration of said interval to its first-named position to render said means including said device effective to change the character of said motor current without interruption thereof to brake said motor to standstill, after completion of that total number of revolutions which the motor would have made if during said time interval it were running at synchronous speed, with said element in a predetermined position.

EDGAR D. DOYLE.
BENJAMIN J. WILSON.

CERTIFICATE OF CORRECTION.

Patent No. 2,119,205.  May 31, 1938.

EDGAR D. DOYLE, ET AL.

It is hereby certified that error appears in the printed specification of the above numbered patent requiring correction as follows: Page 4, second column, line 16, after the word "shown" insert a comma; page 7, first column, line 55, claim 6, for "of" read for; and that the said Letters Patent should be read with this correction therein that the same may conform to the record of the case in the Patent Office.

Signed and sealed this 26th day of July, A. D. 1938.

(Seal)

Henry Van Arsdale,
Acting Commissioner of Patents.